United States Patent
Hölterhoff et al.

(10) Patent No.: US 10,138,996 B2
(45) Date of Patent: Nov. 27, 2018

(54) GEARSHIFT LEVER AND GEARSHIFT PEDAL

(71) Applicants: Norbert Hölterhoff, Duisburg (DE); Fritz Klein, Moers (DE); Wolfgang-Heinz Kersten, Mülheim a. d. Ruhr (DE)

(72) Inventors: Norbert Hölterhoff, Duisburg (DE); Fritz Klein, Moers (DE); Wolfgang-Heinz Kersten, Mülheim a. d. Ruhr (DE)

(73) Assignee: Fritz Max Klein, Moers (DE)

( * ) Notice: Subject to any disclaimer, the term of this patent is extended or adjusted under 35 U.S.C. 154(b) by 157 days.

(21) Appl. No.: 15/127,420

(22) PCT Filed: Mar. 20, 2015

(86) PCT No.: PCT/DE2015/000129
§ 371 (c)(1),
(2) Date: Sep. 20, 2016

(87) PCT Pub. No.: WO2015/139681
PCT Pub. Date: Sep. 24, 2015

(65) Prior Publication Data
US 2017/0130820 A1    May 11, 2017

(30) Foreign Application Priority Data

Mar. 20, 2014 (DE) .................... 20 2014 002 449 U
Dec. 8, 2014 (DE) .................... 20 2014 009 640 U

(51) Int. Cl.
*G05G 1/30* (2008.04)
*B62K 23/08* (2006.01)
(Continued)

(52) U.S. Cl.
CPC ......... *F16H 59/0278* (2013.01); *B62K 23/08* (2013.01); *B62M 25/06* (2013.01); *G05G 1/30* (2013.01); *F16H 2059/0234* (2013.01)

(58) Field of Classification Search
CPC ......... F16H 59/0278; F16H 2059/0236; F16H 2059/0269; F16H 2059/0234;
(Continued)

(56) References Cited

U.S. PATENT DOCUMENTS

| 5,687,617 A | 11/1997 | Wells | |
| 8,087,321 B2 * | 1/2012 | Hollingsworth | ....... B62K 23/08 |
| | | | 74/564 |

(Continued)

FOREIGN PATENT DOCUMENTS

| CN | 103507897 A | 1/2014 | |
| DE | 102009015710 A1 | 10/2009 | |
| WO | WO-2009118413 A1 * | 10/2009 | .............. B62J 21/00 |

OTHER PUBLICATIONS

Machine translation of CN 103507897 A obtained on Apr. 20, 2018. (Year: 2018).*

*Primary Examiner* — Adam D Rogers
(74) *Attorney, Agent, or Firm* — Michael Soderman

(57) ABSTRACT

A gearshift lever for a single-track or multi-track motor vehicle comprising a lever arm and at least one gearshift pedal. The gearshift pedal is for the gearshift lever of a single-track or multi-track vehicle. To prevent damage to the footwear and to be able to execute the shifting process without a great deal of physical effort, there are provisions for the gearshift pedal of the gearshift lever to be fastened to the lever arm so as to be so as to be rotatable around the axial direction of the gearshift pedal. As a result, a situation is (Continued)

achieved in which the gearshift pedal can roll off the shoe during the shifting process in the case of a motorcycle, for instance.

7 Claims, 4 Drawing Sheets

(51) Int. Cl.
*B62M 25/06* (2006.01)
*F16H 59/02* (2006.01)

(58) Field of Classification Search
CPC . B62K 23/08; G05G 1/30; G05G 1/34; G05G 1/40; G05G 1/44; G05G 1/445; G05G 1/46; G05G 1/54; G05G 1/60; B62J 25/00; B62M 25/06
See application file for complete search history.

(56) References Cited

U.S. PATENT DOCUMENTS

| | | | |
|---|---|---|---|
| 8,733,205 B2* | 5/2014 | Fromby | B62J 23/00 |
| | | | 403/344 |
| 9,731,792 B2* | 8/2017 | Sattamini | B62M 25/06 |
| 2010/0011905 A1* | 1/2010 | Li | B62K 21/26 |
| | | | 74/551.9 |
| 2011/0247444 A1 | 10/2011 | Perry | |

* cited by examiner

GEARSHIFT LEVER AND GEARSHIFT PEDAL

CROSS REFERENCE TO RELATED APPLICATIONS

This application is the U.S. national stage of International Application No. PCT/DE2015/000129, filed on 2015 Mar. 20. The international application claims the priority of DE 202014002449.9 filed on 2014 Mar. 20 and the priority of DE 202014009640.6 filed on 2014 Dec. 8; all applications are incorporated by reference herein in their entirety.

BACKGROUND

The invention relates to a gearshift lever for a single-track or multi-track motor vehicle comprising a lever arm and at least one gearshift pedal. The invention further relates to a gearshift pedal for the gearshift lever of a single-track or multi-track vehicle.

Generic gearshift levers serve to change the gear ratio of the transmission of single-track motor vehicles, such as motorcycles or scooters, or of multi-track motor vehicles, such as so-called trikes or quads; the driver of the motor vehicle actuates the gearshift lever with a foot. The gearshift levers are designed in such a way here that shifting can be carried out quickly and without a great deal of force, so the motor vehicle can be driven in an optimal fashion with regard to a gear ratio that is suitable for a driving situation and a change of same that may be necessary. Furthermore, the gearshift levers are designed in such a way that the movement radius for their actuation is as small as possible. It has to be ensured here, however, that the gearshift lever is not accidentally actuated. These measures prevent the muscles of the vehicle driver from getting tired during longer trips, and therefore with numerous instances of shifting, which causes the operating comfort of the motor vehicle to be disadvantageously curtailed.

As a rule, a gearshift lever of this type is arranged in such a way on the motor vehicle that it is actuated with the toes of one foot by pressing it upwards to increase the gear ratio (upshift) or by pressing it downwards to reduce the gear ratio (downshift). To this end, the gearshift lever is comprised of a lever arm and a gearshift pedal that is fastened to the lever arm and that extends at a right angle from it. Designing a shifting device with two lever arms, each of which has a gearshift pedal, is also known, though, for instance from DE 10 2009 015 710 A1. A further lever arm is fastened to the fulcrum of the one lever arm here; one lever arm extends forward and the other lever arm extends to the rear. A shifting process can also be initiated by actuating the lever arm extending to the rear with the gearshift pedal fastened to it with the heel of a foot of the driver of the motor vehicle with this shifting device. According to the document that was cited, the gearshift pedal of the lever arm extending to the rear is swivel-mounted on it, so the driver of the motor vehicle can choose whether he would like to initiate a shifting process with the toes or with the heel of a foot by swiveling the gearshift pedal of the lever arm extending to the rear into his choice of the desired position.

In the case of gearshift levers whose gearshift pedal is designed to be operated with the toes of a foot, there is the problem that the gearshift pedal will slide along the shoe of the driver of the motor vehicle during the upshifting process; frictional resistance is to be overcome because of this, on the one hand, and there is undesired wear on the top part of the shoe of the driver of the motor vehicle, on the other hand. Furthermore, an abraded portion of the rubber sheathing, which gearshift pedals frequently have, also remains on the top of the shoe. The muscles of the driver of the motor vehicle are strained in overcoming the frictional resistance, which is why this effect contributes to tiring of the muscles and therefore detracts from the operating comfort of the motor vehicle. The wear on the shoe and the abraded particles on the shoe disadvantageously detract from its visual appearance. To solve this problem, U.S. Pat. No. 5,687,617 A proposes a cushion that can be connected to the gearshift pedal via two loops so that the cushion is always located between the shoe of the driver of the motor vehicle and the gearshift pedal.

This cushion prevents a rubber sheathing of the gearshift pedal from leaving behind traces of abraded particles and impressions on the shoe. Moreover, the cushion reduces tiring of the muscles of the driver of the motor vehicle and therefore the accompanying muscle soreness. The cushion has a rigid base plate and a cushion made of foamed rubber or flexible neoprene. Two loops are affixed to the base plate; the cushion can be arranged on a gearshift pedal with their assistance. A drawback of this cushion is, to start with, the fact that it has to be purchased separately. A further drawback is that the cushion is located between the gearshift pedal and the shoe of the driver of the motor vehicle, which causes the movement radius to initiate a shifting process to be reduced and which could result in an undesired actuation of the gearshift lever, bringing about a situation in which a driver of a motor vehicle will not assume a relaxed foot position to prevent early upshifting. Furthermore, the cushion has the drawback that the actuation of a gearshift lever equipped with this cushion is unfamiliar to most drivers of corresponding motor vehicles and they therefore reject it.

SUMMARY

The invention relates to a gearshift lever for a single-track or multi-track motor vehicle comprising a lever arm and at least one gearshift pedal. The invention further relates to a gearshift pedal for the gearshift lever of a single-track or multi-track vehicle.

To prevent damage to the footwear and to be able to execute the shifting process without a great deal of physical effort, there are provisions as per the invention for the gearshift pedal of the gearshift lever to be fastened to the lever arm so as to be so as to be rotatable around the axial direction of the gearshift pedal. As a result, a situation is achieved in which the gearshift pedal can roll off the shoe during the shifting process in the case of a motorcycle, for instance.

DETAILED DESCRIPTION

In contrast, the invention is based on the object of creating a gearshift lever and a gearshift pedal whose actuation does not lead to an impaired state of the shoe that is used to initiate the shifting process, which minimizes the tiring of the muscles accompanying the shifting process and whose form corresponds to forms familiar to drivers of motor vehicles.

To solve the problem, the gearshift pedal of the gearshift lever is fastened to the lever arm so as to be capable of rotation around the axial direction of the gearshift pedal. Further advantageous embodiments of the invention follow from the subordinate claims.

The main advantage of a gearshift lever of this type is that a gearshift pedal that is to be actuated with the toes by pushing it up or down and that is arranged on the lever arm above the shoe of a driver of a motor vehicle will not slide along the top of the shoe, but will instead roll off it, when there is an upward inclination of the shoe. This brings about a situation in which particles will not rub off onto the top of the shoe and there will not be any wear and tear on it. Furthermore, a situation is brought about in which sliding-friction resistance does not have to be overcome when the gearshift pedal is actuated, so the muscles strained during the actuation will tire more slowly.

The essential aspect of the invention is the rotation capability of the gearshift pedal; this can be achieved by fastening the gearshift pedal in a rotatable fashion to the lever arm or by designed in the gearshift pedal in such a way that a part of it pointing outwards is rotatable. The fastening of the gearshift pedal to the lever arm such that the gearshift pedal is rotatable in both rotary directions can be achieved when the lever arm has a needle bearing, spherical roller bearing or ball bearing on which a section of the gearshift pedal is supported or when the lever arm has a bearing bushing in which a section of the gearshift pedal is supported.

In a special embodiment of the gearshift lever as per the invention, the gearshift pedal can be fastened to the lever arm so as to only be rotatable in one rotary direction. Because the gearshift pedal can only be rotated in one rotary direction, a situation is prevented in which the gearshift pedal rolls off the sole of a shoe when it is pressed down with the sole, which could disadvantageously lead to the shoe slipping off during a shifting process. The essential aspect of this embodiment of the invention is not just the rotation capability of the gearshift pedal, but also the fact that the gearshift pedal can only rotate in one rotary direction around its axial direction and cannot rotate in a rotary direction opposite that. This can in turn basically be achieved in two ways: Either the gearshift pedal is rotatably fastened to the lever arm of a gearshift lever, wherein the limitation with regard to the possible rotary direction is achieved via a mechanism arranged on the lever arm, or the gearshift pedal is fastened to the lever arm so as to be fixed with regard to rotation, wherein a mechanism integrated into the gearshift pedal brings about both the rotational capability of a part of the gearshift pedal pointing outwards and the limitation of the rotational capability with regard to the possible rotary direction. The latter can be achieved via a drawn cup roller clutch (needle freewheel) or a clamping sleeve (sprag-type freewheel, clamping roller freewheel).

In one embodiment of the gearshift lever as per the invention, it can be mounted on the left-hand side of a single or multi-track motor vehicle; the gearshift pedal is fastened to the lever arm in a rotatable fashion such that the gearshift pedal will roll off the top of the shoe when there is an outward tilt of a left-hand shoe of a driver of a motor vehicle. In this embodiment, the gearshift pedal can be rotated in a counterclockwise direction with regard to the face of the gearshift pedal turned away from the motor vehicle. In a further embodiment of the gearshift lever as per the invention, it can be mounted on the right-hand side of a single or multi-track motor vehicle; the gearshift pedal is fastened to the lever arm in a rotatable fashion such that the gearshift pedal will roll off the top of the shoe when there is an outward tilt of a right-hand shoe of a driver of a motor vehicle. In this embodiment, the gearshift pedal can be rotated in a clockwise direction with regard to the face of the gearshift pedal turned away from the motor vehicle.

To solve the problem, the invention further proposes a gearshift pedal that is characterized by the fact that the gearshift pedal has a support and an at least one-piece sleeve mounted on the support, wherein the sleeve is mounted in a rotatable fashion on the support. Single or multi-track motor vehicles can be retrofitted with the gearshift pedal as per the invention without having to replace the entire gearshift lever, because gearshift pedals known in the prior art are usually fastened to the lever arms via screw connections and they can therefore be removed. The gearshift pedal as per the invention has, in contrast to the gearshift pedal of the previously described gearshift lever as per the invention, a sleeve with the characteristic of being capable of rotation around its axial direction. This functionality is achieved in the previously described gearshift lever by mounting the gearshift pedal on the lever arm; a person skilled in the art can transfer a mechanism integrated into the gearshift pedal to this mounting without difficulty. The rotational capability of the sleeve on the support in both rotary directions can be achieved by the sleeve having a needle bearing, spherical roller bearing or ball bearing via which the sleeve is mounted on the support or by the sleeve comprising a bearing bushing through which the support extends.

In a special embodiment of the gearshift pedal as per the invention, there can be provisions for the sleeve to only be rotatably mounted on the support in a first rotary direction and to not be rotatable on the support in a second rotary direction opposite to that. This results in the advantage already described above in connection with the gearshift lever as per the invention that the shoe of the driver of the motor vehicle is prevented from slipping off during an upshift when the gearshift pedal is pressed down.

In a further embodiment of the gearshift pedal, there can be provisions for the support and the sleeve to be arranged in a shell; the shell is attached to the sleeve so that a relative movement between the shell and the sleeve is ruled out. The support and the sleeve are surrounded by a shell that makes contact with the shoe of the driver of the motor vehicle during the actuation of the gearshift pedal in this embodiment. Because of the fixed connection between the sleeve and the shell, the shell rolls off the top of the shoe when there is an upwards tilt of the top of the shoe. The shell prevents the sleeve and the support from being exposed to weather; corrosion is prevented because of that and, moreover, this can contribute to a pleasant optical appearance of the gearshift pedal if the shell is made of chrome-plated steel or aluminum, for instance. The shell preferably has the form of a hollow cylinder that is open on one side or on both sides.

There are provisions in accordance with a further embodiment of the gearshift pedal as per the invention for at least one contact element to be arranged on an external radial surface of the sleeve or the shell; there are usually multiple contact elements arranged in parallel with one another, as an example. The contact element makes contact with the shoe of the driver of the motor vehicle during actuation of the gearshift pedal and serves, on the one hand, to provide cushioning and, on the other hand, to create a contact with a good grip between the shoe and the sleeve or, as the case may be, the shell of the gearshift pedal so that they will absolutely roll off the shoe instead of sliding along it. The contact element will preferably extend over the entire periphery of the sleeve or the shell, which does not necessarily have to be the case because they do not rotate by 360 degrees when rolling off the shoe of the driver of the motor vehicle. The contact element can be made, as an example, of rubber, a plastic or a metal such as brass. Rubber is elastically flexible, on the one hand, and brings about contact with a good grip on the shoe of the driver of the motor vehicle, on the other hand. A suitable plastic, for instance a formed plastic, is likewise elastically flexible and brings about contact with a good grip on the shoe of the driver of the motor vehicle. Contact elements made of brass could also improve the optical appearance of the gearshift pedal. Furthermore, the surface of the sleeve, the shell or at least one contact element can be smooth or can have a surface structure that serves, like the contact element itself, to improve the contact between a shoe of the driver of the motor vehicle and the gearshift pedal and therefore prevents sliding of the gearshift pedal on the shoe, because the gearshift pedal is supposed to roll on the shoe.

There are provisions in a preferred embodiment for the sleeve to be a drawn cup roller clutch (needle freewheel) or a clamping sleeve (sprag-type freewheel, clamping roller freewheel) or to comprise a drawn cup roller clutch or a clamping sleeve to achieve a rotational capability of the sleeve in only one rotary direction.

A drawn cup roller clutch has at least one internal ring element that is fastened to the inside surface of the sleeve. The ring element has recesses or through-holes distributed around the periphery that extend in the axial direction of the sleeve and that have cylindrical pins arranged in them. When the sleeve is rotated on the support in a first rotary direction, the pins are pressed against a first wall of the recesses or through-holes and rotate there with a progressive rotation of the sleeve. If, in contrast, the sleeve is rotated in a second rotary direction opposite the first rotary direction, the pins are pressed against a second wall that is opposite the first wall of the recesses or through-holes and that is shaped in such a way that rotation of the pins is prevented by an opposing frictional force between the pins and the second wall, so the sleeve cannot be rotated further because the pins on the outer surface of the support can no longer roll off. In addition to the ring element connected in a fixed way with the inner surface of the sleeve, there can be other elements that are not connected in a fixed way with the inner surface of the sleeve and that can therefore be freely rotated. These ring elements, which can likewise have pins arranged in recesses or through-holes, do not make any contribution to the operation of the sleeve that was described, however, but instead serve to simplify the process of pushing the sleeve onto the support.

The support preferably has a fastener extending in its axial direction that is designed, as an example, in the form of a pin with threading on the outer surface. The fastener serves to fasten the gearshift pedal as per the invention to a lever arm of the gearshift lever; the advantageous effects are solely brought about by the rotation of the sleeve, together with the shell if necessary, while the support is fastened to the lever arm without the capability of rotation.

In accordance with the invention, the gearshift pedal is fastened to the lever arm of a gearshift lever in such a way that an upward tilt of a foot of a driver of a motor vehicle to carry out a shifting process (upshifting as a rule) will cause the sleeve or, as the case may be, the shell to roll off the top of the shoe on the foot. Because of the rotational capability of the sleeve or, as the case may be, the shell in only one rotary direction, in so far as this characteristic exists in accordance with a special embodiment of the gearshift lever or gearshift pedal as per the invention, it is simultaneously ruled out here that the sleeve or, as the case may be, the shell will roll off the sole of the shoe when there is a downward tilt or movement of the foot of the driver of the motor vehicle to carry out a shifting process (downshifting as a rule), which could disadvantageously lead to slippage.

Emphasis is to especially be given to the fact that the rotational capability of the gearshift pedal is the essential aspect of the invention and that the aspect that the gearshift pedal can only be rotated in one rotary direction, so that slippage of the gearshift pedal is additionally prevented, is added in a special embodiment of the invention. The embodiment of the invention that is chosen for a concrete vehicle in the end is dependent, not with the least importance, upon the costs of the embodiment of the invention that is selected.

BRIEF DESCRIPTION OF THE DRAWINGS

The invention will be explained once again below with the aid of the figures.

The drawings show the following.

DETAILED DESCRIPTION OF THE PREFERRED EMBODIMENTS

Figure 1:
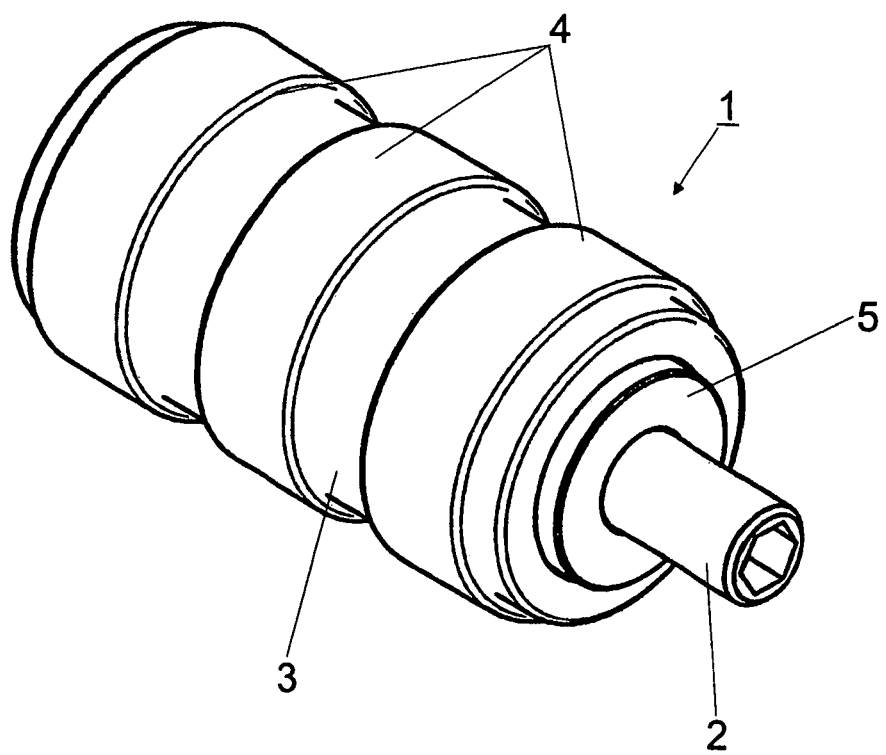
FIG. 1 shows a view in perspective of a first embodiment of the gearshift pedal as per the invention.

FIG. 1 shows a view in perspective of a first embodiment of a gearshift pedal 1 as per the invention. The gearshift pedal 1 comprises a support that has a fastener 2 extending in its axial direction, a sleeve that is not shown and a shell 3. A threading can be provided on the fastener 2. A sealing element 5 is arranged on the support in addition to the sleeve. Three contact elements 4 that extend over the entire periphery of the shell 3 and that are made of rubber are arranged on the outer surface of the shell 3. The shell 3 is made of aluminum, and the support is made of stainless steel. The shell 3 has the shape of a hollow cylinder open on one side that accommodates the support, the sleeve and the sealing element 5. The contact elements 4 are connected in a fixed way with the outer surface of the shell 3, for instance via gluing. The sleeve involves a drawn cup roller clutch whose outer surface is connected in a fixed way with the shell 3, for instance via gluing, so that the shell 3 can be rotated together with the sleeve in a first rotary direction on the support and cannot be rotated in a rotary direction opposite that. Nevertheless, there can be provisions for the sleeve to be capable of rotation on the support in two rotary directions around the axial direction of the support, in which case the sleeve will not involve a drawn cup roller clutch or a clamping sleeve; instead the sleeve will comprise a needle bearing, spherical roller bearing or ball bearing, for instance, via which the sleeve is mounted on the support or will comprise a bearing bushing through which the support extends.

Figure 2:
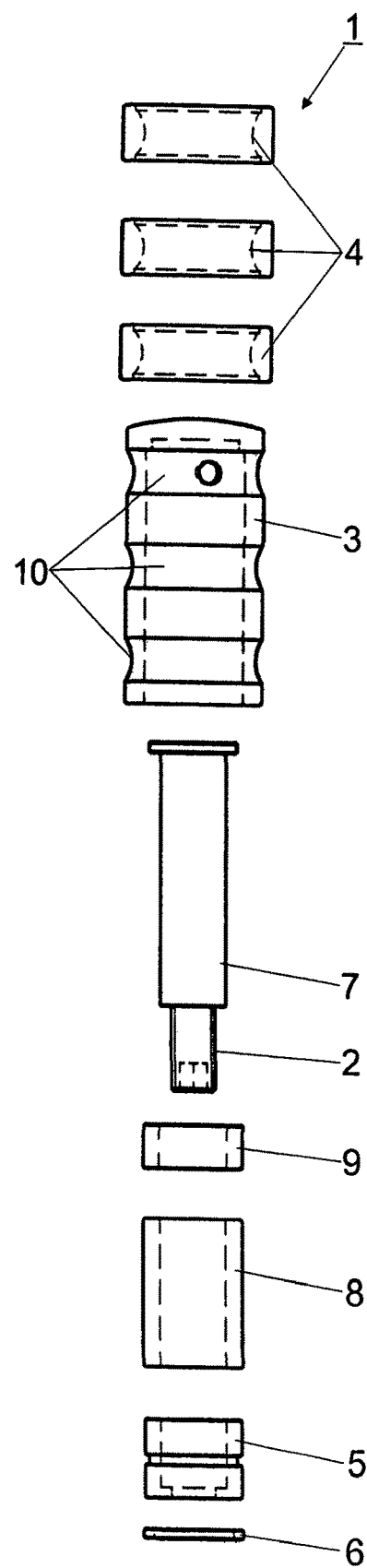
FIG. 2 shows an exploded view of the first embodiment of the gearshift pedal as per the invention.

FIG. 2 shows an exploded view of the first embodiment of the gearshift pedal 1 as per the invention. A slide ring 9, a sleeve 8 in the form of a drawn cup roller clutch or clamping sleeve and a sealing element 5 with a sealing ring 6 are arranged on the support 7. The support 7 is accommodated, together with the slide ring 9, the sleeve 8 and the sealing element 5 by a shell 3 designed in the form of a hollow cylinder open on one side; the fastener 2 of the support 7 extends beyond the shell 3. A threading can be provided on the fastener 2. The shell 3 is connected in a fixed way to the outer surface of the sleeve 8, for instance via glue or screw connections, so that the shell 3 can be rotated in a first rotary direction together with the sleeve 8 on the support 7. Recesses 10 in which contact elements 4 are located that are connected in a fixed way to the outer surface of the shell 3, for instance via gluing, are arranged on the outer surface of the shell 3. The contact elements 4 surround the shell 3 over its entire periphery. The slide ring 9 is made of a plastic, as is the sealing element 5; the sealing ring 6 is made of rubber.

Figure 3:
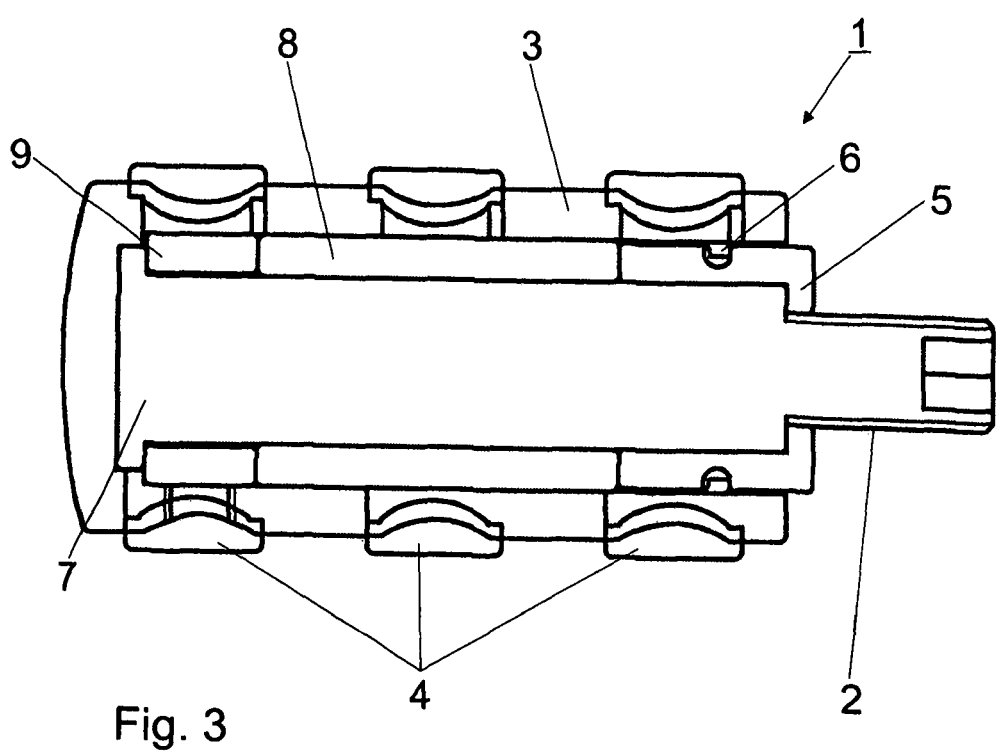
FIG. 3 shows a sectional view of the first embodiment of the gearshift pedal as per the invention and FIG. 4 shows a side view of a single-track motorcycle that is equipped with an embodiment of the gearshift lever as per the invention or an embodiment of the gearshift pedal as per the invention.

FIG. 3 shows a sectional view of the first embodiment of the gearshift pedal 1 as per the invention. A slide ring 9, a sleeve 8 and a sealing element 5 are arranged next to one another on the support 7. The sealing element 5 has a recess formed in its external radial surface in which the sealing ring 6 is arranged. The sealing element 5 prevents the penetration of moisture between the support 7 and the sleeve 8, on the one hand, and between the sleeve 8 and the shell 3, on the other hand. The support 7 is accommodated, together with the slide ring 9, the sleeve 8 and the sealing element 5, by the shell 3, which has the shape of a hollow cylinder open on one side. Recesses that extend over the entire periphery of the shell 3 are arranged in the outer surface of the shell 3. The contact elements 4 are arranged in the recesses and fastened to the shell 3, for instance via gluing.

Figure 4:
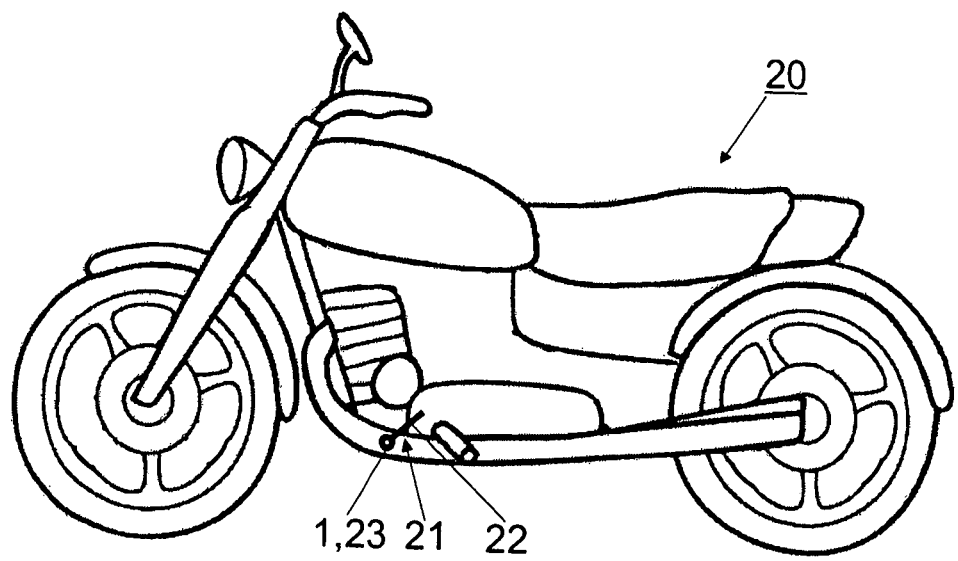

FIG. 4 shows a side view of a single-track motorcycle 20 that is equipped with an embodiment of the gearshift pedal 1 as per the invention or an embodiment of the gearshift lever 21 as per the invention. The first embodiment of the gearshift pedal 1 as per the invention that was previously described can be arranged on the lever arm 23 of the gearshift lever 21. Instead of that, a gearshift pedal 23 can also be fastened to the lever arm 21 so as to be capable of rotation around its axial direction; the gearshift pedal 23 is fastened to the lever arm 21 so as to be capable of rotation in both directions or in only one direction. To this end, the lever arm 21 can have a needle bearing, spherical roller bearing or ball bearing in which a section of the gearshift pedal 23 is mounted and, moreover, the lever arm 21 can have a bearing bushing in which a section of the gearshift pedal 23 is mounted.

The invention claimed is:

1. A gearshift lever (21) for a single-track or multi-track motor vehicle, comprising:
   a lever arm (22), and
   at least one gearshift pedal (23),
   characterized in that
   the gearshift pedal (23) is fastened so as to be rotatable around an axial direction to the lever arm (22), wherein said gearshift pedal (23) is only capable of rotation in a first rotary direction.

2. The gearshift lever (21) according to claim 1, characterized in that
   the lever arm (22) is configured to accommodate a needle bearing, spherical roller bearing or ball bearing in which a section of the gearshift pedal (23) is mounted or that the lever arm (22) is configured to accommodate a bearing bushing in which the section of the gearshift pedal (23) is mounted.

3. The gearshift lever (21) according to claim 1, characterized in that
   the gearshift lever (21) can be mounted on the left-hand side of the single-track or multi-track motor vehicle, wherein the gearshift pedal (23) is rotatably fastened to the lever arm (22) in such a way that the gearshift pedal (23) will roll off the top of a left-hand shoe when there is an upward tilt of said left-hand shoe of a motor-vehicle driver.

4. The gearshift lever (21) according to claim 1, characterized in that
   the gearshift lever (21) can be mounted on the right-hand side of the single-track or multi-track motor vehicle, wherein the gearshift pedal (23) is rotatably fastened to the lever arm (22) in such a way that the gearshift pedal (23) will roll off the top of a right-hand shoe when there is an upward tilt of said right-hand shoe of a motor-vehicle driver.

5. A single-track or multi-track motor vehicle that has the gearshift lever according to claim 1.

6. A gearshift pedal (1) for a gearshift lever of a single-track or a multi-track motor vehicle, comprising:
   a gearshift pedal (1), which has a support (7), and a sleeve (8) rotatably mounted on the support (7), and the sleeve (8) is only be capable of rotation in a first rotary direction.

7. The gearshift pedal (1) according to claim 6, characterized in that
   the sleeve (8) is a drawn cup roller clutch or a clamping sleeve.

\* \* \* \* \*